Patented Nov. 20, 1928.

1,692,417

UNITED STATES PATENT OFFICE.

ALFRED PONGRATZ, OF GRAZ, AUSTRIA, ASSIGNOR TO FELICE BENSA, OF GENOA, ITALY.

MANUFACTURE OF CYANIDES OF THE PERYLENE SERIES.

No Drawing. Application filed June 18, 1926, Serial No. 116,943, and in Austria June 26, 1925.

3.10 dicyanide of perylene has been prepared by Weitzenböck and Seer (Berichte der Deutschen Chemischen Gesellschaft 1913, page 1994) in a toilsome and complicated way by condensing 4, 4' dicyanide, 1, 1' dinaphthyl. Although in the halogen derivatives of perylene the halogens are comparatively difficultly replaceable, yet it has been found that under suitable conditions these same compounds may be readily converted into perylene cyanides. The cyanogen compounds of perylene obtained by the present process are valuable intermediate products for the manufacture of dye stuffs.

Example I.

1 part by weight of dichloro perylene is intimately mixed with 1 part by weight of cuprous cyanide and the mixture is heated to 300° centigrade. At this temperature it is molten and very fluid. In the course of stirring the mass becomes thicker and finally forms a tough paste which occurs after about an hour's heating. On cooling down the mass becomes solid and brittle.

The product is finely ground and repeatedly treated with aqueous ammonia for removing the major part of the copper. Then the mass is dissolved in hot nitrobenzene, the solution is filtered off and permitted to crystallize. The dicyanide crystallizes out in brownish red needles, shows no fusion point up to 350° centigrade and dissolves in concentrated sulphuric acid in the cold with a brown color; on heating the color changes into rose. The compound is little soluble in solvents having a low boiling point, but the solutions show a marked green fluorescence, in solvents having a higher boiling point it is readily soluble in the heat.

Example II.

1 part by weight of dichloro perylene and 1 part by weight of cuprous cyanide are dissolved in 15 parts by weight of quinoline and are heated for two hours to boiling, reflux being made use of. After cooling the liquid is removed by suction from the crystalline product of reaction, which is thoroughly shaken with aqueous ammonia and recrystallized from nitrobenzene. The product consists in the main of monochloroperylencnitril and fuses at 316° centigrade. The compound is little soluble in solvents having a comparatively low boiling point, is easily soluble in solvents having a higher boiling point and dissolves in concentrated sulphuric acid in the cold with a blue color.

Example III.

1 part of tetrachloro-perylene is intimately mixed with 2 parts of cuprous cyanide and to the mixture just so much quinoline is added that it becomes pasty. The whole is gradually heated in an air bath with reflux to the boiling temperature of quinoline. After the mixture has become dark brown the heating is stopped.

After cooling the paste is freed from quinoline either by suction or by means of dilute hydrochloric acid. In any case the nitril thus obtained which is contaminated with copper salts is treated for 24 hours with aqueous ammonia. The nitril thus purified crystallizes in dark brown needles.

According to the results of analysis this compound is a dichlorodinitril perylene. In solvents having a low boiling point it is scarcely soluble, in concentrated sulphuric acid it dissolves with a reddish brown color and olive green fluorescence. It is more readily soluble in solvents having a higher boiling point such as nitrobenzene, or quinoline from which it can be obtained in crystals.

Example IV.

1 part of dibromo-perylene is intimately mixed with 0.5 to 1 part of cuprous cyanide and is heated for several hours, preparatory to the maximum temperature of 300° centigrade with 10 to 20 parts of peridine. When the reaction is completed the mass is diluted with water and aqueous ammonia is added thereto and left to settle for 24 hours. The brown raw product may be purified to crystallization from nitrobenzene. The compound thus obtained is identical as to all of its properties with the product obtained in Example I.

The following equation shows the nature of the reaction in a typical example:—

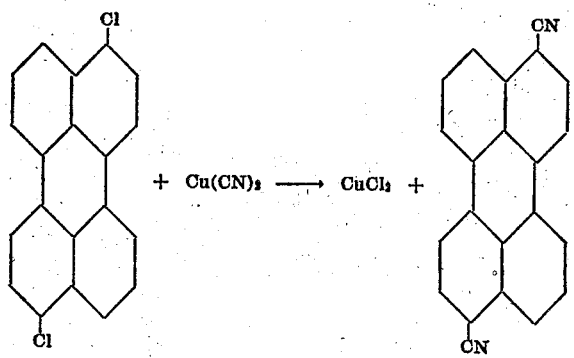

Instead of dibromoperylene also dichloroperylene may be converted in the same way into a nitril.

In this example, the reaction must take place in a closed vessel owing to the pressure of the pyridine vapor at the high temperatures used, but such increased pressure is not essential for the reaction.

As solvents tertiary cyclic bases liquid at room temperature, such as pyridine and quinoline are used.

What I claim is:

1. A process for manufacturing cyanides of the perylene series consisting in mixing halogen compounds of perylene with metal cyanides and heating the mixture to 300° centigrade.

2. A process of manufacturing cyanides of the perylene series consisting in mixing halogen compounds of perylene with metal cyanides, adding to the mixture a tertiary cyclic base liquid at room temperature acting as a solvent, and heating the solution to boiling.

3. A process of manufacturing cyanides of the perylene series consisting in mixing halogen compounds of perylene with metal cyanides adding to the mixture a tertiary cyclic base liquid at room temperature acting as a solvent, and heating the above mixture in a closed vessel to a temperature above the normal boiling point of the solvent, but to a temperature not exceeding 300° centigrade.

In testimony whereof I have affixed my signature.

ALFRED PONGRATZ.